Patented Oct. 14, 1947

2,429,179

UNITED STATES PATENT OFFICE 2,429,179

SUBSTITUTED 2-β-ACETANILIDOVINYL BENZOXAZOLES AND METHOD OF PREPARATION

Alfred W. Anish, Johnson City, N. Y.

No Drawing. Application March 10, 1944, Serial No. 525,937

2 Claims. (Cl. 260—307)

My invention relates to new compounds of the benzoxazole class and their method of preparation.

More specifically, my invention relates to 2-β-acetanilidovinyl-benzoxazoles which contain as a substituent in the aryl nucleus isomeric (secondary and tertiary) alkyl or aryl-alkyl groups. My new compounds may be used as intermediates in the production of new oxacarbocyanine dyes which are particularly useful in sensitizing photographic emulsions. Such dyes made from my novel benzoxazole intermediates are characterized by a steep cut-off in the spectral curve. Such characteristics are highly desirable, especially in sensitizing dyes used in color photography emulsions, where it is desirable that the multi-layer emulsions be sensitive to certain ranges of wave lengths.

My novel compounds may be represented by the following structural formula:

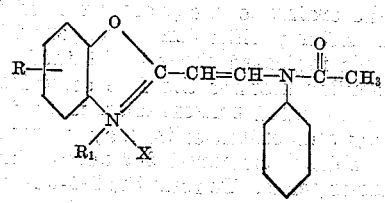

In the above formula R represents an isomeric (secondary and tertiary) alkyl or aryl-alkyl group, such as isobutyl, cumyl, isoamyl, tertiary amyl, tertiary hexyl, isopropyl, diisobutyl, 2- or 3-methyl-butyl groups. The radical may be substituted in any position in the benzene nucleus. Generally the 5 and 6 positions are preferred. $R_1$ represents an alkyl, alkoxyalkyl, aryl or aralkyl group, such as, for example, methyl, ethyl, β-ethoxyethyl, butyl, allyl or benzyl, and X represents an anion.

In general, the intermediates may be prepared by first nitrating a phenol which is substituted in the benzene nucleus by a secondary or tertiary alkyl or aryl-alkyl radical. Such nitro-phenols may be prepared according to the process of Patent No. 2,207,727. The nitro-compound is then reduced to form the corresponding amino-phenol amine and the latter is reacted with a fatty acid, fatty acid anhydride or fatty acid-fatty acid anhydride mixture to form the secondary or tertiary substituted benzoxazole.

I then react any suitable quaternary ammonium salt of the secondary and tertiary substituted benzoxazole so obtained, such as the ethiodide, with diphenylformamidine in the presence of acetic anhydride to produce my novel compounds.

In general, the benzoxazoles which are used as starting materials in preparing my new 2-β-acetanilidovinyl-benzoxazoles may be prepared by the process set forth in my application Serial No. 525,936 filed March 10, 1944. The following examples are given by way of illustrating the process for producing such starting materials.

*Example 1.*—2 - methyl-6-tertiary-butyl-benzoxazole.

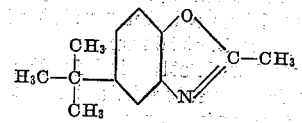

2-nitro-4-tertiary-butyl-phenol was prepared by the method described in U. S. 2,207,727 as follows: 150 grams of p-tertiary-butyl-phenol in 500 cc. of benzol was nitrated with a mixture of 128.0 cc. of 70% nitric acid and 256.0 cc. of water. The nitro compound was vacuum distilled and has a boiling point of 136° C. at 14 mm. The nitro-tertiary-butyl-phenol was then reduced with alkaline sodium hydrosulfite as follows: 20 grams of 2-nitro-4-tertiary-butyl-phenol in 800 cc. of 10% caustic soda solution was heated to 82° C. and 75.0 grams of sodium hydrosulfite added. The clear alkaline solution was acidified with dilute acetic acid and the white crystalline plates of 2-amino-4-tertiary-butyl-phenol precipitated. The compound melts at 162–4° C. The yield obtained was 16.4 grams. By heating 44.7 grams of the dried amino-tertiary-butyl-phenol with glacial acetic acid, or with an acetic acid-acetic acid anhydride mixture containing 75 cc. of each, 45.0 grams of 2-methyl-6-tertiary-butyl-benzoxazole was obtained. The compound has a boiling point of 137° C. at 16 mm.

When heated with ethyl iodide, the substituted benzoxazole is converted into the corresponding quaternary ammonium ethiodide salt.

*Example 2.*—2-methyl-6-cumyl-benzoxazole.

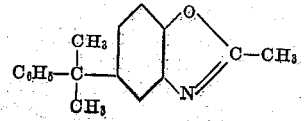

2-nitro-4-cumyl-phenol was prepared by nitrating a mixture of 24.2 grams of p-cumyl-phenol in 40.0 cc. of benzol with a mixture of 12.8 cc. of 70% nitric acid and 25.6 cc. of water at 7–10° C. The nitro compound had a boiling point of 145° C. at 15 mm. 2-amino-4-cumyl-phenol was obtained from the nitro compound by alkaline sodium hydrosulfite reduction. 2-methyl-6-cumyl-benzoxazole was then prepared by refluxing 8.2 grams of the 2-amino-4-cumyl-phenol with an acetic acid-acetic anhydride mixture containing 15 cc. of each, and finally dry distilling the reaction mixture. The 2-methyl-6-cumyl-benzoxazole obtained boils at 162° C. at 16 mm.

When heated with ethyl iodide, the substituted benzoxazole is converted into the corresponding quaternary ammonium salt.

*Example 3.—2-methyl-6-isoamyl-benzoxazole.*

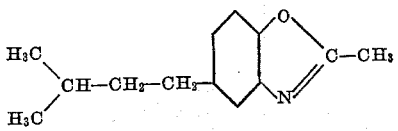

2-nitro-4-isoamyl-phenol was prepared by nitrating a mixture of 37.4 grams of p-isoamyl-phenol in 150.0 cc. of benzene with a mixture of 22.6 cc. of 70% nitric acid and 22.6 cc. of water at 0–8° C. The nitro compound has a boiling point of 145–150° C. at 16 mm.

10.0 grams of the 2-nitro-4-isoamyl-phenol thus obtained was reduced with alkaline sodium hydrosulfite. 16 grams of the amino-compound so obtained was dry distilled from an acetic acid-acetic anhydride mixture containing 25 cc. of each to form 2-methyl-6-isoamyl-benzoxazole. The compound has a boiling point of 270° C. at 760 mm. and 147° C. at 16 mm.

When heated with ethyl iodide, the substituted benzoxazole is converted into the corresponding quaternary ammonium salt.

The benzoxazoles obtained according to the above examples may be converted into other quaternary salts by heating with other suitable alkylating agents such as ethyl-p-toluenesulfonate, methyl sulfate, diethyl sulphate, or any other acid radical forming an alkyl or aralkyl ester.

To form the 5-substituted secondary and tertiary alkyl and alkyl-aryl benzoxazoles, I proceed in the same manner as set forth in the above examples, except that I start with a 2-nitro-phenol which is substituted in the 5-position with a tertiary-butyl, a cumyl, or an isoamyl, or any other secondary or tertiary-alkyl or aryl-alkyl radical.

The following examples will serve to illustrate the method of producing my new 2-β-acetanilido-vinyl benzoxazoles.

*Example 4.—2 - β - acetanildovinyl-6-tertiary-butyl-benzoxazole-ethiodide.*

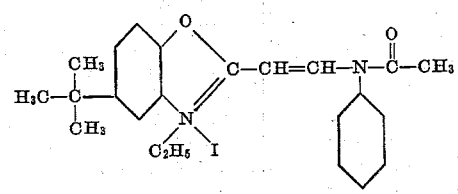

3.4 gms. (0.01 mol) of 2-methyl-6-tertiary-butyl-benzoxazole ethiodide, which may be obtained according to Example 1, and 3.9 gms. of diphenylformamidine (0.01 mol plus 100% excess) were dissolved in 15 cc. of acetic anhydride and the mixture was heated in an oil bath to 140° C. for about forty minutes. The reaction mixture was cooled and ethyl ether added to precipitate the 2-β-acetanilidovinyl-benzoxazole. The reaction product was purified by crystalizing from dilute ethyl alcohol. The product was obtained in the form of colorless crystals, having a melting point of 210° C. and the probable formula given above.

*Example 5.—2-β-acetanilidovinyl - 6 - cumyl-benzoxazole ethiodide.*

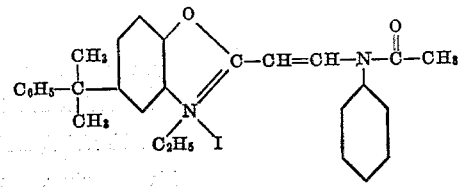

2-methyl-6-cumyl-benzoxazole ethiodide obtainable by the process of Example 2 and diphenylformamidine in the proportions of 1 mol to 1 mol were reacted in the presence of acetic anhydride according to the process of Example 4. After purification a compound having the probable formula given above is obtained.

*Example 6.—2-β-acetanilidovinyl - 6-isoamyl-benzoxazole ethiodide.*

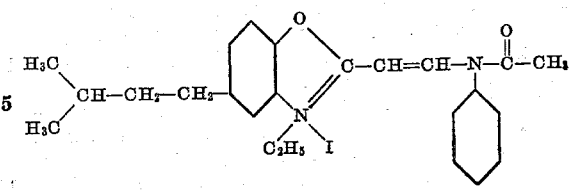

2-methyl-6-isoamyl-benzoxazole ethiodide, the product obtainable according to Example 3 and diphenylformamidine in the ratio of 1 mol to 1 mol were reacted in the presence of acetic anhydride according to the process recited in Example 4. After purification a compound having the formula indicated above is obtained.

In a similar manner the free secondary and tertiary substituted benzoxazoles, instead of the quaternary ammonium salts, may be reacted in order to obtain the novel 2-β-acetanilidovinyl-benzoxazoles per se. To form the 2-β-acetanilido-vinyl-benzoxazoles which are substituted by the secondary and tertiary alkyl and alkyl-aryl groups in the 5-position, I react the corresponding substituted benzoxazoles with diphenylform-amidine in the presence of acetic anhydride in the same manner as set forth in the above examples.

The novel compounds may be condensed to form the new oxacarbocyanine dyes as disclosed in my co-pending application Serial No. 525,935 filed March 10, 1944. In general the process of forming the dyes with my novel intermediate comprises condensing the 2-β-acetanilidovinyl derivatives of the secondary and tertiary substituted benzoxazoles with secondary and tertiary substituted 2-methyl benzoxazoles in the presence of pyridine, or any other suitable condensing agent.

I claim:
1. 2-β-acetanilidovinyl-6-cumyl - benzoxazole and the quaternary ammonium salts thereof.
2. A process for preparing a benzoxazole which comprises reacting 2-methyl-6-cumyl-benzox- azole ethiodide with diphenylformamidine in the presence of acetic anhydride.

ALFRED W. ANISH.

REFERENCES CITED

The following references are of record in the file of this patent:

UNITED STATES PATENTS

| Number | Name | Date |
|---|---|---|
| 2,071,899 | Piggott et al. | Feb. 23, 1937 |
| 2,336,843 | Brooker et al. | Dec. 14, 1943 |
| 2,083,804 | Zeh | June 15, 1937 |
| 2,323,504 | Wilson | July 6, 1943 |
| 2,207,727 | Galloway | July 16, 1940 |
| 2,265,909 | Kendall | Dec. 9, 1941 |
| 2,173,486 | Schneider | Sept. 19, 1939 |

FOREIGN PATENTS

| Number | Country | Date |
|---|---|---|
| 621,404 | Germany | Nov. 7, 1935 |

OTHER REFERENCES

Chem. Abstracts, vol. 26, page 705, citing: Bull. Soc. Chim. (4), vol. 49, pp. 1213–1222 (1931).

Chem. Abstracts, vol. 32, page 2119.

Certificate of Correction

Patent No. 2,429,179.                                                                                                   October 14, 1947.

ALFRED W. ANISH

It is hereby certified that the above numbered patent was erroneously issued to the inventor "Alfred W. Anish," whereas said patent should have been issued to *General Aniline & Film Corporation*, as assignee of the entire interest therein, as shown by the record of assignments in this Office; in the printed specification, column 1, line 48, strike out the word "amine"; column 4, line 1, for "heated in" read *heated on*; and that the said Letters Patent should be read with these corrections therein that the same may conform to the record of the case in the Patent Office.

Signed and sealed this 10th day of February, A. D. 1948.

[SEAL]

THOMAS F. MURPHY,
*Assistant Commissioner of Patents.*